US007590641B1

(12) United States Patent
Olson

(10) Patent No.: US 7,590,641 B1
(45) Date of Patent: Sep. 15, 2009

(54) SELECTING VARIOUS ALGORITHMS TO COMPRESS COLUMNS OF ANALYTIC DATA IN A READ-ONLY RELATIONAL DATABASE IN A MANNER THAT ALLOWS DECOMPRESSION OF THE COMPRESSED DATA USING MINIMAL SYSTEM RESOURCES

(75) Inventor: Jack Edward Olson, Austin, TX (US)

(73) Assignee: QD Technology, LLC, Clifton, NJ (US)

( * ) Notice: Subject to any disclaimer, the term of this patent is extended or adjusted under 35 U.S.C. 154(b) by 268 days.

(21) Appl. No.: 11/395,709

(22) Filed: Mar. 31, 2006

Related U.S. Application Data

(60) Provisional application No. 60/668,323, filed on Apr. 4, 2005.

(51) Int. Cl.
*G06F 17/30* (2006.01)
*G06F 15/16* (2006.01)
(52) U.S. Cl. .................... 707/100; 707/101; 708/203
(58) Field of Classification Search ............ 707/100, 707/101
See application file for complete search history.

(56) References Cited

U.S. PATENT DOCUMENTS

| 4,905,146 A | | 2/1990 | Barker et al. ............ 714/32 |
| 5,546,575 A | * | 8/1996 | Potter et al. ............ 707/101 |
| 5,794,229 A | | 8/1998 | French et al. ............ 707/2 |
| 5,870,036 A | * | 2/1999 | Franaszek et al. ........ 341/51 |
| 6,460,046 B1 | * | 10/2002 | Meek ...................... 707/102 |
| 6,493,728 B1 | * | 12/2002 | Berger ..................... 707/202 |
| 7,024,414 B2 | | 4/2006 | Sah et al. .................. 707/101 |
| 2003/0090397 A1 | * | 5/2003 | Rasmussen ............... 341/51 |
| 2003/0142960 A1 | * | 7/2003 | Yokota et al. ............. 386/94 |
| 2004/0221021 A1 | | 11/2004 | Domer .................... 709/219 |
| 2005/0192998 A1 | * | 9/2005 | Dittrich et al. ........... 707/102 |

OTHER PUBLICATIONS

Guy Blelloch, Introduction to Data Compresson, Oct. 2001, pp. 1, 2, 9 and 10.*

* cited by examiner

*Primary Examiner*—Tony Mahmoudi
*Assistant Examiner*—Brittany N McCue
(74) *Attorney, Agent, or Firm*—Robert A. Voigt, Jr.; Winstead P.C.

(57) ABSTRACT

A method, computer program product and system for balancing compression efficiency against access performance. Source data is read from a database row by row and column by column within each row. Algorithm(s) are selected to compress the data read for each column. Algorithms are selected in a manner that closely maximizes the amount of data stored in a given amount of disk space but requires minimal system resources to decompress the compressed data. These algorithms are stored in a control block. Further, parameters that allow the read data to be stored in a compressed manner efficiently are stored in the control block. Upon a second reading of the source data, data is compressed column by column using the appropriate algorithms and parameters. The compressed data may then be decompressed using the appropriate algorithms and parameters. In this manner, a better balance may be realized between compression efficiency and access performance.

78 Claims, 10 Drawing Sheets

SELECTING VARIOUS ALGORITHMS TO COMPRESS COLUMNS OF ANALYTIC DATA IN A READ-ONLY RELATIONAL DATABASE IN A MANNER THAT ALLOWS DECOMPRESSION OF THE COMPRESSED DATA USING MINIMAL SYSTEM RESOURCES

CROSS REFERENCE TO RELATED APPLICATIONS

This application is related to the following commonly owned copending U.S. patent application:

Provisional Application Ser. No. 60/668,323, "Method for Compressing Data at a Column Level that Balances Compression Efficiency Against Access Performance," filed Apr. 4, 2005, and claims the benefit of its earlier filing date under 35 U.S.C. §119(e).

TECHNICAL FIELD

The present invention relates to the field of data compression and decompression for databases, and more particularly to selecting various algorithms to compress columns of analytic data in a read-only relational database in a manner that allows decompression of the compressed data using minimal system resources.

BACKGROUND INFORMATION

A database may refer to a collection of related records that is created and managed by what is commonly referred to as a database management system. One type of database is a "relational database." A relational database may refer to a database that maintains a set of separate, related files or tables, but combines data elements from the tables for queries and reports when required.

The present invention is directed to a relational database that stores a particular type of data, referred to herein as "analytic data." Analytic data may refer to data that is analyzed. For example, stock transaction data may be analyzed for trends such as the age group of the individuals engaged in stock transactions. In another example, insurance data may be analyzed to determine whether it is profitable to maintain particular individuals as customers. In another example, data may be analyzed for fraud.

Often the data stored in these related tables is "compressed" in order to maximize the amount of data stored in a given amount of disk space. Data compression may refer to the process of encoding information using fewer bits than an unencoded representation (original format of the data) would use through use of specific encoding schemes. For example, an article could be encoded with fewer bits if we accept the convention that the word "compression" be encoded as "comp." Once the analytic data is compressed, the compressed analytic data may be "read-only." Read-only may refer to data that will not change after it is compressed. It is noted that when "compressed data" is used herein that "compressed data" refers to "compressed analytic data." It is further noted that when "database" or "relational database" is used herein that "database" or "relational database" refers to a "read-only database" or a "read-only relational database," respectively.

When a user desires to access the data in the database, the compressed data needs to be "decompressed" in order to reverse the effects of data compression. Decompression may refer to the act of reversing the effects of data compression which restores the data to its original form prior to being compressed. In this manner, the user is able to retrieve the requested data in its original form.

The present invention is directed to a decompression approach that does not decompress the entire rows of compressed data in a relational database table at a single time. Instead, the present invention is directed to a decompression approach that selectively decompresses column data in relational data tables, for rows that are used by a specific query access as that query is being processed.

There are many different compression algorithms used to encode or compress the data stored in relational databases, such as the Huffman algorithm and the Lempel-Ziv algorithm. These compression algorithms focus on maximizing the amount of compression. That is, these compression algorithms focus on maximizing the amount of data stored in a given amount of disk space. However, compressed data using these compression algorithms require extensive system resources (disk access time and instruction cycle time) in order to decompress the compressed data. That is, the time required for a user to retrieve the requested data in its original form from the relational database may be extensive using such high compression algorithms.

Hence, there is an inverse proportionality between compression efficiency and access performance (amount of system resources to decompress the compressed data). If a balance could be achieved between compression efficiency and access performance, then a balance may be made with saving disk space while, at the same time, improving access performance. That is, if data could be compressed in a manner that closely maximizes the amount of data stored in a given amount of disk space as these high compression algorithms but requires much less system resources to decompress the compressed data, then a better balance may be realized between compression efficiency and access performance. Currently, there are no products that attempt to provide such a balance.

Therefore, there is a need in the art for compressing analytic data in a manner that closely maximizes the amount of data stored in a given amount of disk space as these high compression algorithms but requires much less system resources to decompress the compressed data.

SUMMARY

The problems outlined above may at least in part be solved in some embodiments by reading source data from a database row by row and selecting one or more algorithms to compress the data read for each column within each row read. Particular algorithms or strategies are selected in a manner that closely maximizes the amount of data stored in a given amount of disk space as the high compression algorithms discussed in the Background Information section but requires much less system resources to decompress the compressed data. For example, one such strategy is to assign a bit structure to each high frequency value in the column. Another strategy involves tokenizing a portion of the values in a column as well as ensuring that the token translation list (list of token values) does not exceed a threshold value. Another strategy uses a floor value and stores column values as the difference between the real values and the floor value. There are many more strategies discussed herein that compress data efficiently and allow a minimal use of system resources to decompress the compressed data. These strategies or algorithms will be stored in a control block (data structure). Further, parameters (e.g., floor value) that allow the read data to be stored in a compressed manner efficiently will be stored in the control block as well. Upon a second reading of the source data, data is compressed column by column within each row using the appropriate algorithms stored in the control block. The compressed data may then be decompressed using the appropriate parameters stored in the control block. By selectively using the appropriate algorithms or strategies in compressing data and selectively using the appropriate parameters to decompress the compressed data, a better balance may be realized between compression efficiency and access performance.

In one embodiment of the present invention, a method for balancing compression efficiency against access performance may comprise the step of reading source data from a database row by row. The method may further comprise generating a value frequency list indicating all unique values found for each column in each row read in the database and a frequency of occurrence for each value. The method may further comprise selecting one or more algorithms to compress the source data read for each column, where the one or more algorithms are selected based on the value frequency list and the frequency of occurrence for each value. The method may further comprise storing the selected one or more algorithms to compress the source data read for each column in a control block. The method may further comprise reading the source data a second time row by row. The method may further comprise compressing the source data read the second time using the stored selected one or more algorithms.

The foregoing has outlined rather generally the features and technical advantages of one or more embodiments of the present invention in order that the detailed description of the invention that follows may be better understood. Additional features and advantages of the invention will be described hereinafter which may form the subject of the claims of the invention.

BRIEF DESCRIPTION OF THE DRAWINGS

A better understanding of the present invention can be obtained when the following detailed description is considered in conjunction with the following drawings, in which.

DETAILED DESCRIPTION

The present invention comprises a method, computer program product and system for balancing compression efficiency against access performance. In one embodiment of the present invention, source data is read from a database row by row and column by column within each row. After all rows are read, an algorithm is selected for compressing data for each row based on information computed during the read. Particular algorithms or strategies are selected in a manner that closely maximizes the amount of data stored in a given amount of disk space but requires much less system resources to decompress the compressed data. For example, one such strategy is to assign a bit structure to each high frequency value in the column. Another strategy involves tokenizing a portion of the values in a column as well as ensuring that the token translation list (list of token values) does not exceed a threshold value. Another strategy uses a floor value and stores column values as the difference between the real values and the floor value. There are many more strategies discussed herein that compress data efficiently and allow a minimal use of system resources to decompress the compressed data. These strategies or algorithms will be stored in a control block (data structure). Further, parameters (e.g., floor value) that allow the read data to be stored in a compressed manner efficiently will be stored in the control block as well. Upon a second reading of the source data, data is compressed column by column within each row using the appropriate algorithms and parameters stored in the control block. The compressed data may then be decompressed using the appropriate algorithms and parameters stored in the control block. By selectively using the appropriate algorithms and parameters in compressing data and selectively using the same appropriate algorithms and parameters to decompress the compressed data, a better balance may be realized between compression efficiency and access performance.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Figure 1:
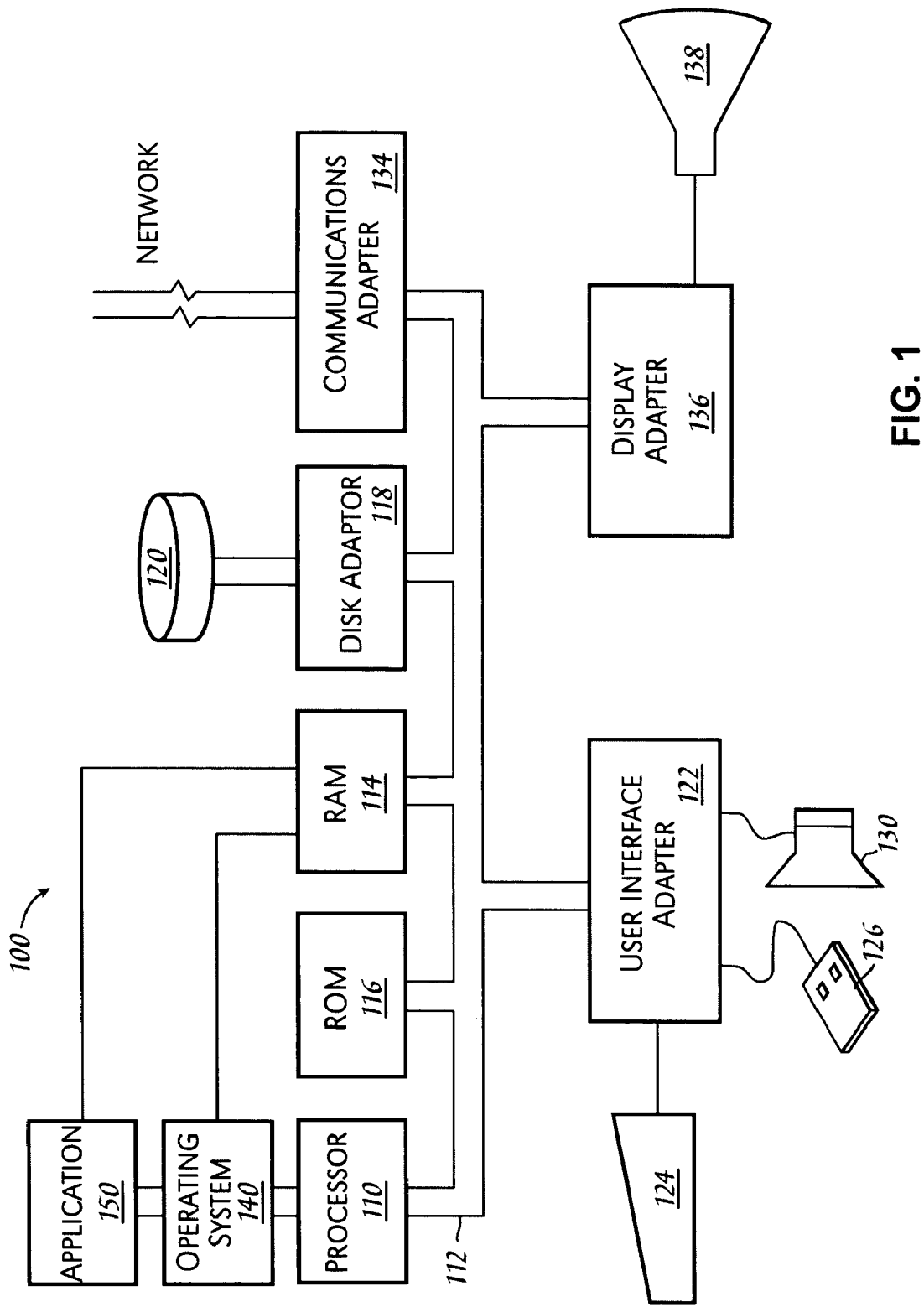
FIG. 1 is a hardware configuration of a computer system in accordance with an embodiment of the present invention.

FIG. 1—Computer System

FIG. 1 illustrates a typical hardware configuration of computer system 100 which is representative of a hardware environment for practicing the present invention. Computer system 100 may have a processor 110 coupled to various other components by system bus 112. An operating system 140 may run on processor 110 and provide control and coordinate the functions of the various components of FIG. 1. An application 150 in accordance with the principles of the present invention may run in conjunction with operating system 140 and provide calls to operating system 140 where the calls implement the various functions or services to be performed by application 150. Application 150 may include, for example, an application for balancing compression efficiency against access performance as described below in association with FIGS. 2-3, 4A-D, 5, and 6A-B.

Read-Only Memory (ROM) 116 may be coupled to system bus 112 and include a basic input/output system ("BIOS") that controls certain basic functions of computer system 100. Random access memory (RAM) 114 and disk adapter 118 may also be coupled to system bus 112. It should be noted that software components including operating system 140 and application 150 may be loaded into RAM 114 which may be computer system's 100 main memory for execution. Disk adapter 118 may be an integrated drive electronics ("IDE")

adapter that communicates with a disk unit 120, e.g., disk drive. It is noted that the application for balancing compression efficiency against access performance, as described below in association with FIGS. 2-3, 4A-D, 5 and 6A-B, may reside in either disk unit 120 or in application 150. It is further noted that the control block (data structure) created by the application for balancing compression efficiency against access performance, as discussed herein, may reside in disk unit 120.

Referring to FIG. 1, computer system 100 may further comprise a communications adapter 134 coupled to bus 112. Communications adapter 134 may interconnect bus 112 with an outside network, e.g., Local Area Network (LAN), Wide Area Network (WAN), enabling computer system 100 to communicate with other such systems. I/O devices may also be connected to system bus 112 via a user interface adapter 122 and a display adapter 136. Keyboard 124, mouse 126 and speaker 130 may all be interconnected to bus 112 through user interface adapter 122. Data may be inputted to computer system 100 through any of these devices. A display monitor 138 may be connected to system bus 112 by display adapter 136. In this manner, a user is capable of inputting to computer system 100 through keyboard 124 or mouse 126 and receiving output from computer system 100 via display 1238 or speaker 130.

Implementations of the invention include implementations as a computer system programmed to execute the method or methods described herein, and as a computer program product. According to the computer system implementations, sets of instructions for executing the method or methods may be resident in the random access memory 114 of one or more computer systems configured generally as described above. Until required by computer system 100, the set of instructions may be stored as a computer program product in another computer memory, for example, in disk unit 120. Furthermore, the computer program product may also be stored at another computer and transmitted when desired to the user's workstation by a network or by an external network such as the Internet.

Figure 2:
FIG. 2 is an exemplary illustration of the contents of a relational database in accordance with an embodiment of the present invention.
Figure 3:
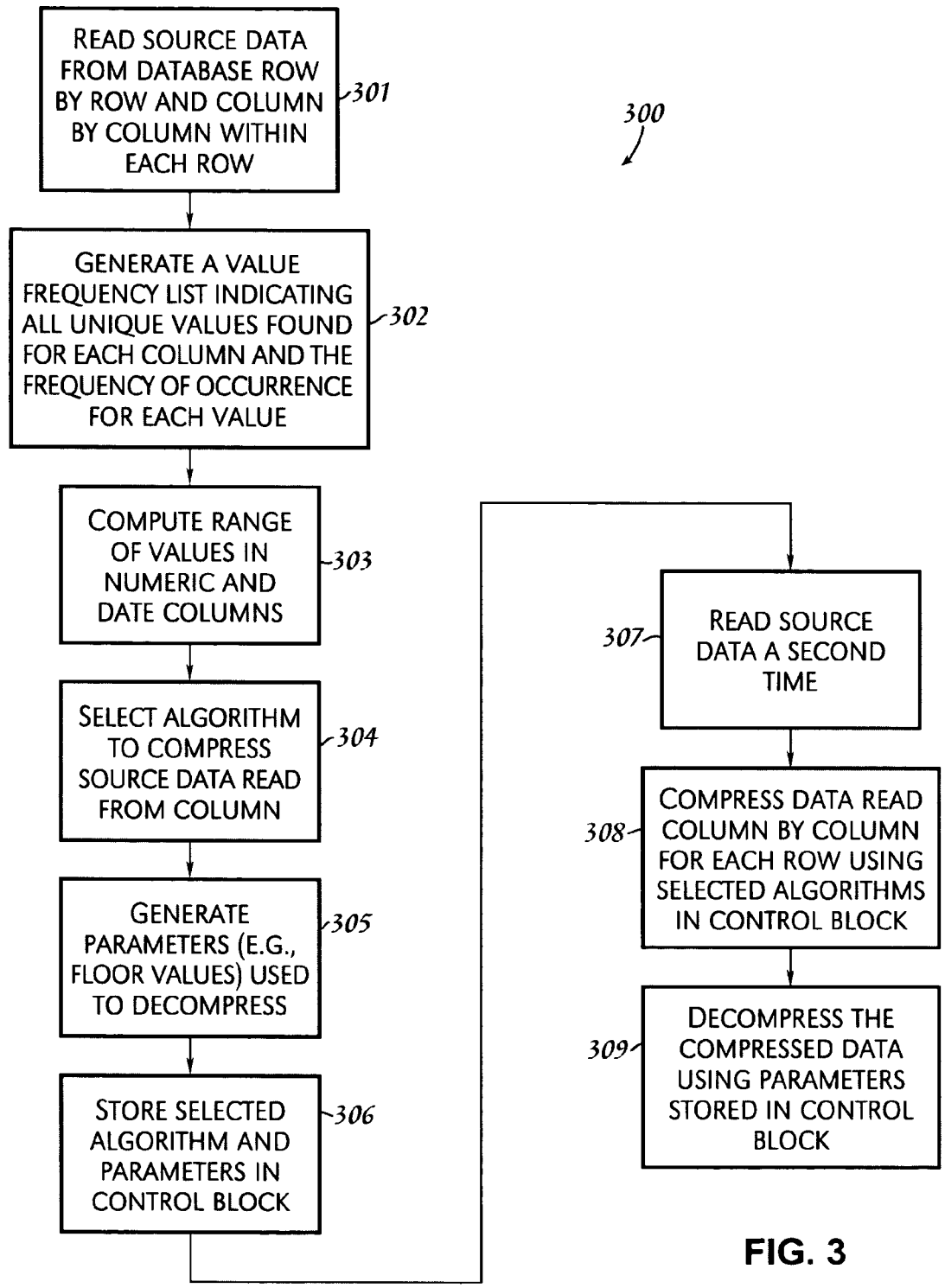
FIG. 3 is a flowchart of a method for balancing between compression efficiency and access performance in accordance with an embodiment of the present invention.
Figure 5:
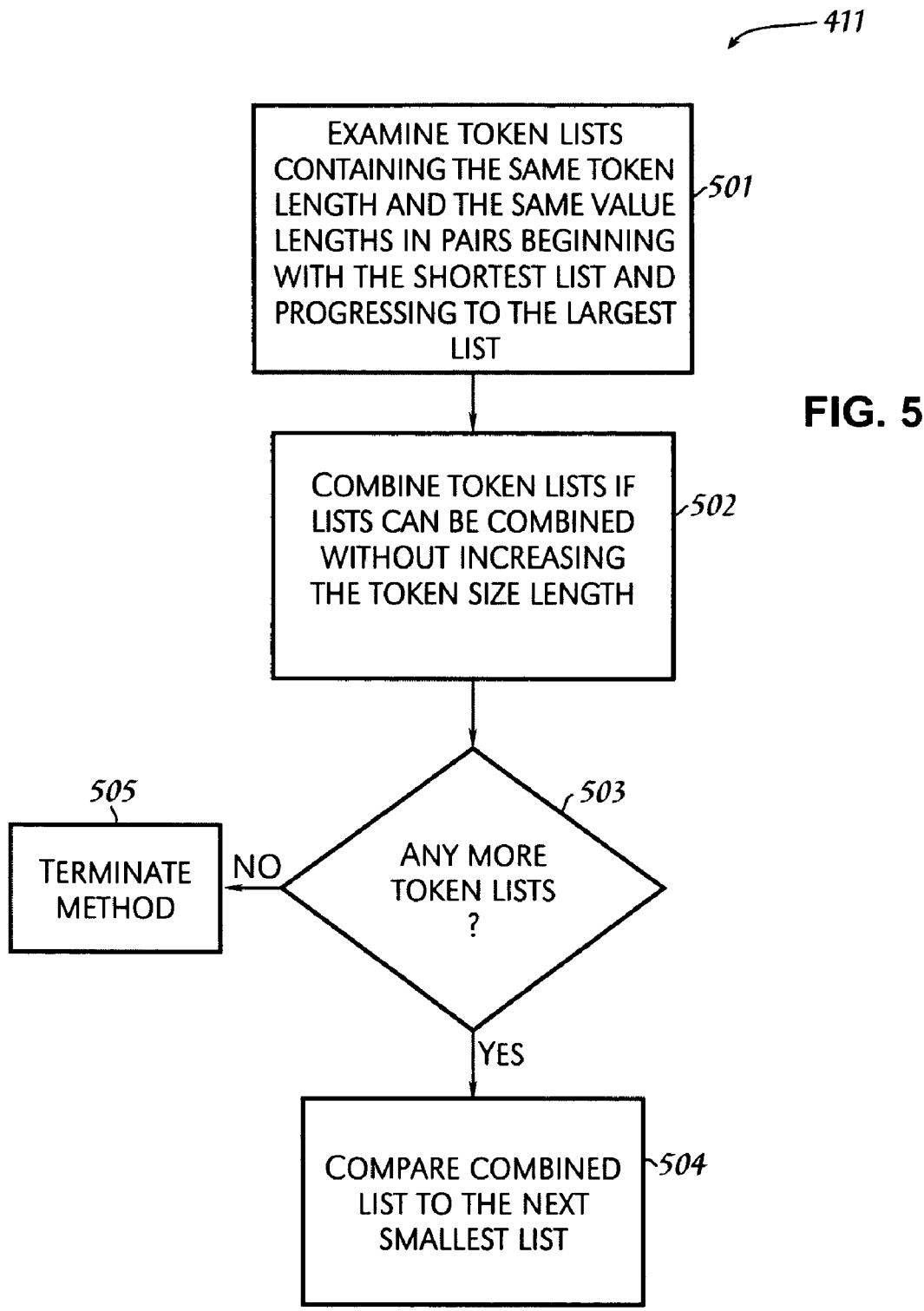
FIG. 5 is a flowchart of a method for performing the step of determining whether to share token lists in accordance with an embodiment of the present invention.
Figure 6A:
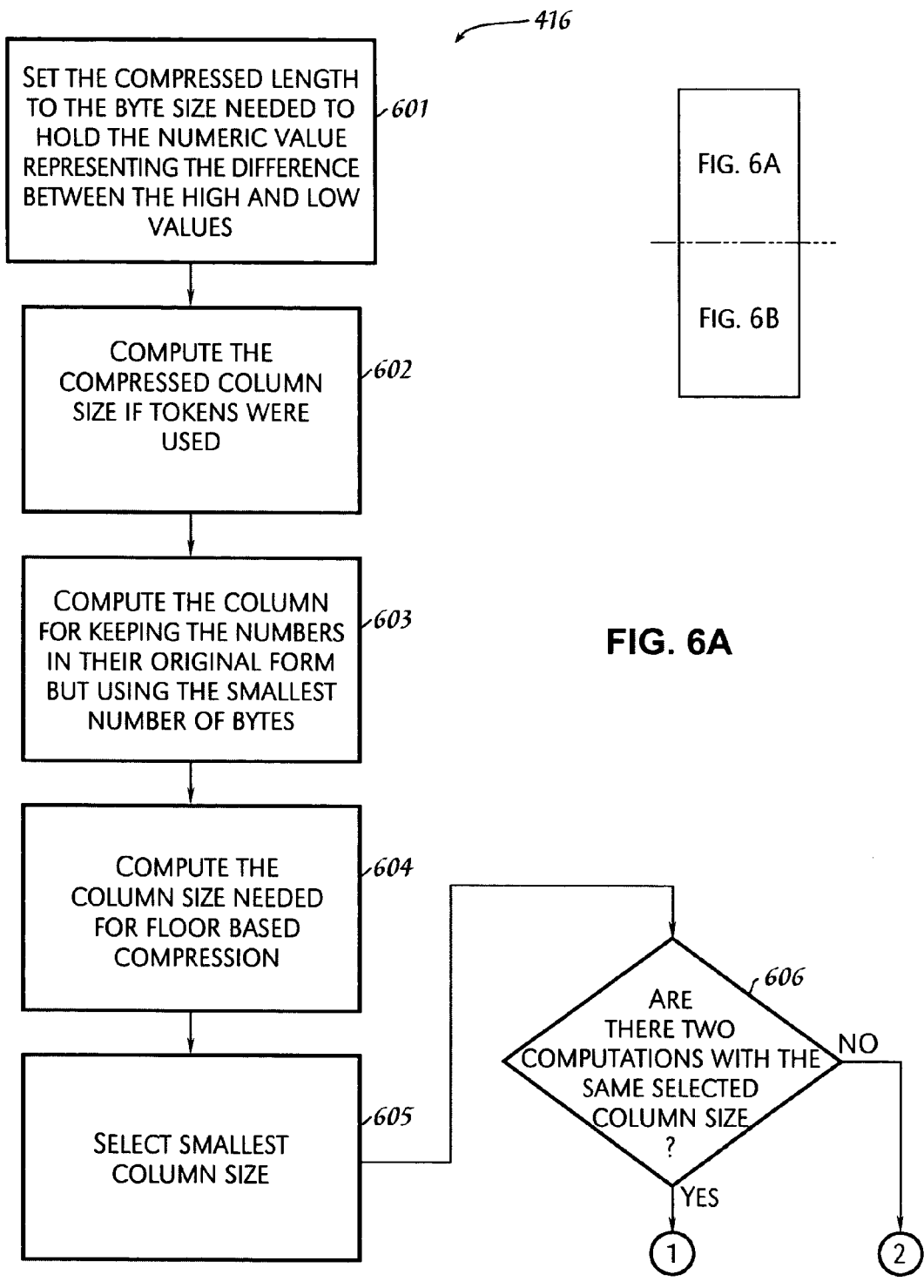
FIGS. 6A-B are a flowchart of a method for performing the step of determining whether to apply the floor based compression strategy in numeric or date columns in accordance with an embodiment of the present invention.
Figure 6B:
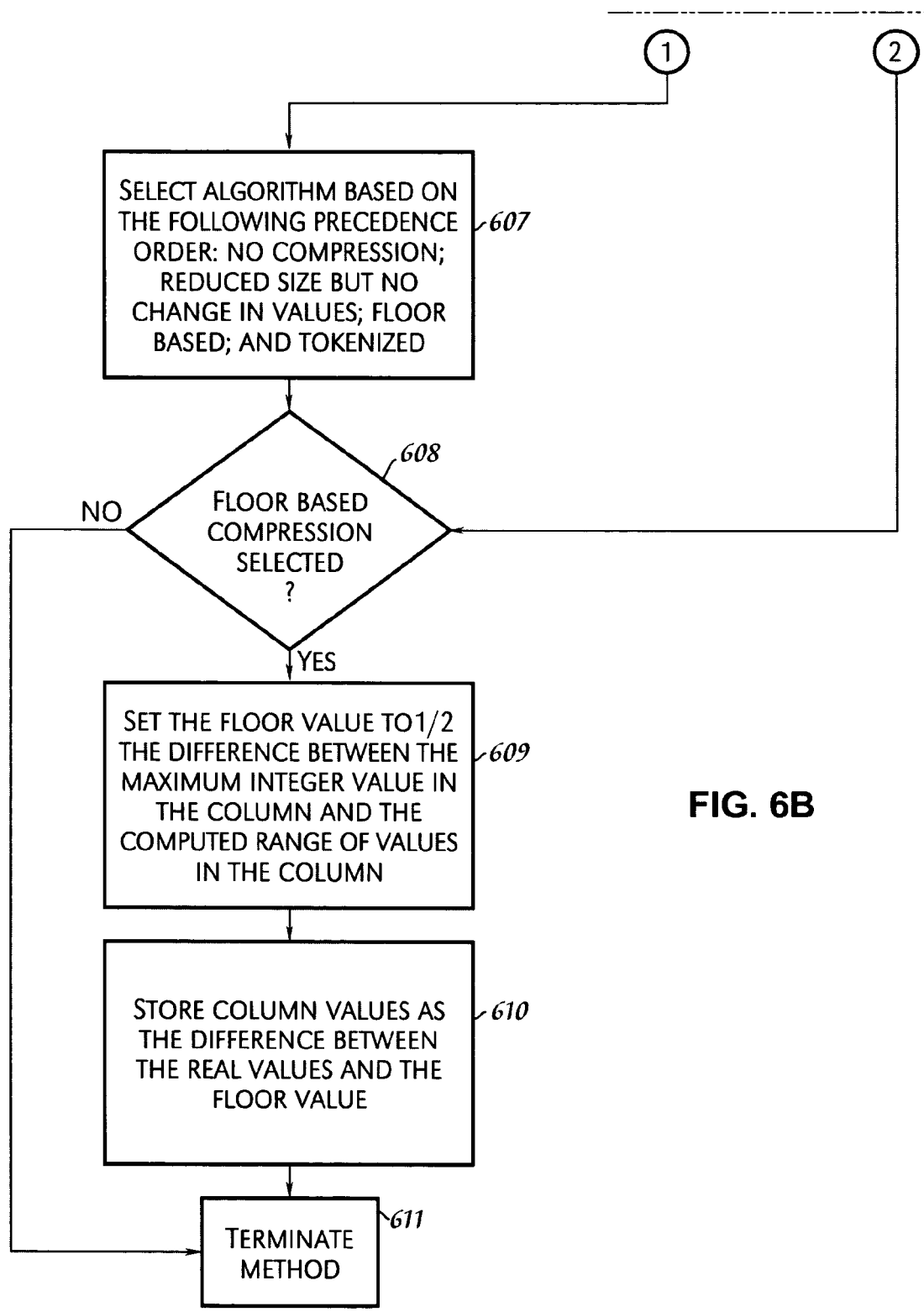

As stated in the Background Information section, there is an inverse proportionality between compression efficiency and access performance (amount of system resources to decompress the compressed data). If a balance could be achieved between compression efficiency and access performance, then a balance may be made with saving disk space while improving access performance. That is, if data could be compressed in a manner that closely maximizes the amount of data stored in a given amount of disk space as high compression algorithms but requires much less system resources to decompress the compressed data, then a better balance may be realized between compression efficiency and access performance. Currently, there are no products that attempt to provide such a balance. Therefore, there is a need in the art for compressing data in a manner that closely maximizes the amount of data stored in a given amount of disk space as high compression algorithms but requires much less system resources to decompress the compressed data. An application that compresses data in a manner that closely maximizes the amount of data stored in a given amount of disk space as high compression algorithms but requires minimal system resources to decompress the compressed data is described below in association with FIGS. 2-3, 4A-D, 5 and 6A-B. FIG. 2 is an exemplary illustration of the contents in a relational database. FIG. 3 is a flowchart of a method for balancing between compression efficiency and access performance. FIGS. 4A-D are a flowchart of a method for performing the step of selecting one or more algorithms to compress source data read from a column in a database. FIG. 5 is a flowchart of a method for performing the step of determining whether to share token lists. FIGS. 6A-B are a flowchart of a method for performing the step of determining whether to apply a floor based compression strategy in numeric or date columns.

As stated above, FIG. 2 is an exemplary illustration of the contents in a relational database. The principles of the present invention as described below may be used to compress data stored in such a database in a manner that closely maximizes the amount of data stored in a given amount of disk space as high compression algorithms but requires minimal system resources to decompress the compressed data.

FIG. 2—Illustration of Contents in a Relational Database

FIG. 2 illustrates an exemplary relational database 200 that contains columns of data designated as "EMP_NAME"; "DATE_HIRED"; "SALARY"; and "DEPARTMENT." Each of these columns contains a listing of records or units of data. Each column contains the same type of data. For example, the column designated as "EMP_NAME" includes a listing of records that each contains characters (employee names). The column designated "DATE_HIRED" includes a listing of records that each contain a date. The column designated "SALARY" includes a listing of records that each contain a number (salary). The column designated "DEPARTMENT" includes a listing of records that each contain characters (departments within an organization).

The data stored in relational database 200 may be compressed and stored on a disk (not shown) in a manner as described below in association with FIG. 3. By compressing the data in a manner as described below in association with FIG. 3, a better balance may be realized between compression efficiency and access performance.

It is noted that even though the description below describes compressing the data stored in relational database 200 that any relational database or flat file that stores tabular data may be compressed using the method described below in association with FIG. 3.

FIG. 3—Method for Balancing Compression Efficiency Against Access Performance FIG. 3 is a flowchart of a method 300 for balancing compression efficiency against access performance in accordance with an embodiment of the present invention.

Referring to FIG. 3, in conjunction with FIGS. 1-2, in step 301, application 150 reads the source data from database 200 row by row and column by column within each row. The initial reading of the source data may be referred to herein as the "first pass."

In step 302, application 150 generates a value frequency list indicating all unique values found for each column read and the frequency of occurrence for each value. For example, Table 1 illustrates such a value frequency list.

TABLE 1

| Column Value | Frequency |
|---|---|
| Chicago | 200 |
| Austin | 700 |
| New York | 350 |
| San Francisco | 900 |
| Houston | 780 |
| Philadelphia | 430 |

In step 303, application 150 computes a range of values in numeric and date columns. For example, if a column has a low value of 100,000 and a high value of 150,000, then application 150 would compute a range of 100,000 to 150,000 for that column.

In step 304, application 150 selects one or more algorithms to compress the source data read from a column. A more detail description of step 304 is provided below in association with FIGS. 4A-D. FIGS. 4A-D, in accordance with an embodiment of the present invention, are a flowchart of the step of selecting one or more algorithms to compress the source data read from a column in a manner that closely maximizes the amount of data stored in a given amount of disk space as the high compression algorithms discussed in the Background Information section but requires less system resources to decompress the compressed data.

Figure 4A:
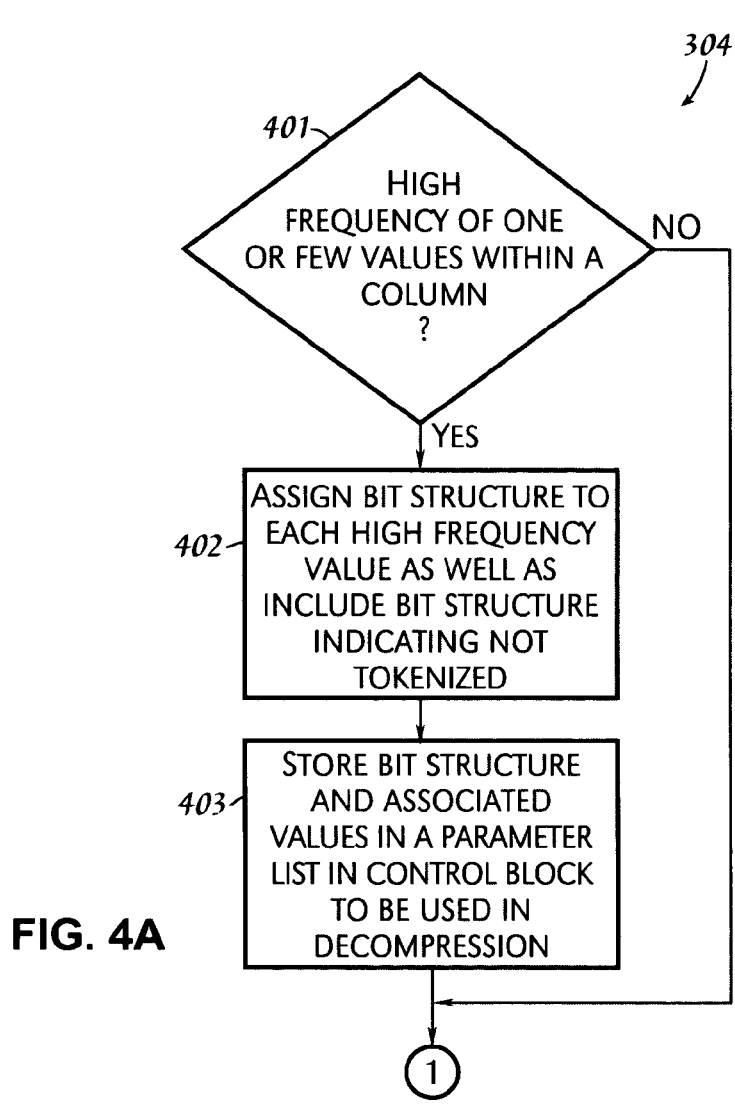
FIGS. 4A-D are a flowchart of a method for performing the step of selecting one or more algorithms to compress source data read from a column in a database in accordance with an embodiment of the present invention.
Figure 4A:
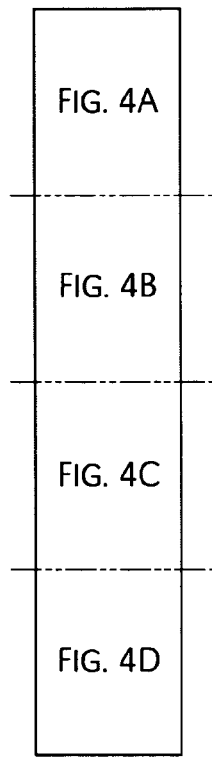

Referring to FIG. 4A, in connection with FIGS. 1-3, in step 401, application 150 determines whether there is a high frequency of one or a few values within a column using the value frequency list described above. For example, if 99% of the values in a particular column read from database 200 are either Austin, Cedar Park or Round Rock, then application 150 may determine that there is a high frequency of a few values within that column.

In step 402, if application 150 determines there is a high frequency of one or a few values within a column using the value frequency list described above, then, in step 402, application 150 assigns a bit structure to each high frequency value as well as include a bit indicating not tokenized. That is, in step 402, a bit structure is assigned that has sufficient bits to encode all of the high frequency values. For example, referring to the above example, if there are three values (e.g., Austin, Cedar Park, Round Rock), then a bit structure that can hold four values is used (the extra value is used to indicate not tokenized). Since four values are used, a two bit structure is used. Values are then assigned to the bit structures. For example, bit structure 00=no encoding (not tokenized); bit structure 01=Austin; bit structure 10=Cedar Park; bit structure 11=Round Rock. The structure length and the list of values are stored in the control block as parameters. By assigning bits to particular values instead of storing the entire value (character string), less storage space is required to store the same data. After assigning values to the bit structures, the remainder of the high frequency values in the list is considered for additional compression as described below.

In step 403, application 150 stores the bit structure and assigned values in a parameter list in a control block (data structure) to be used in the decompression.

Figure 4B:
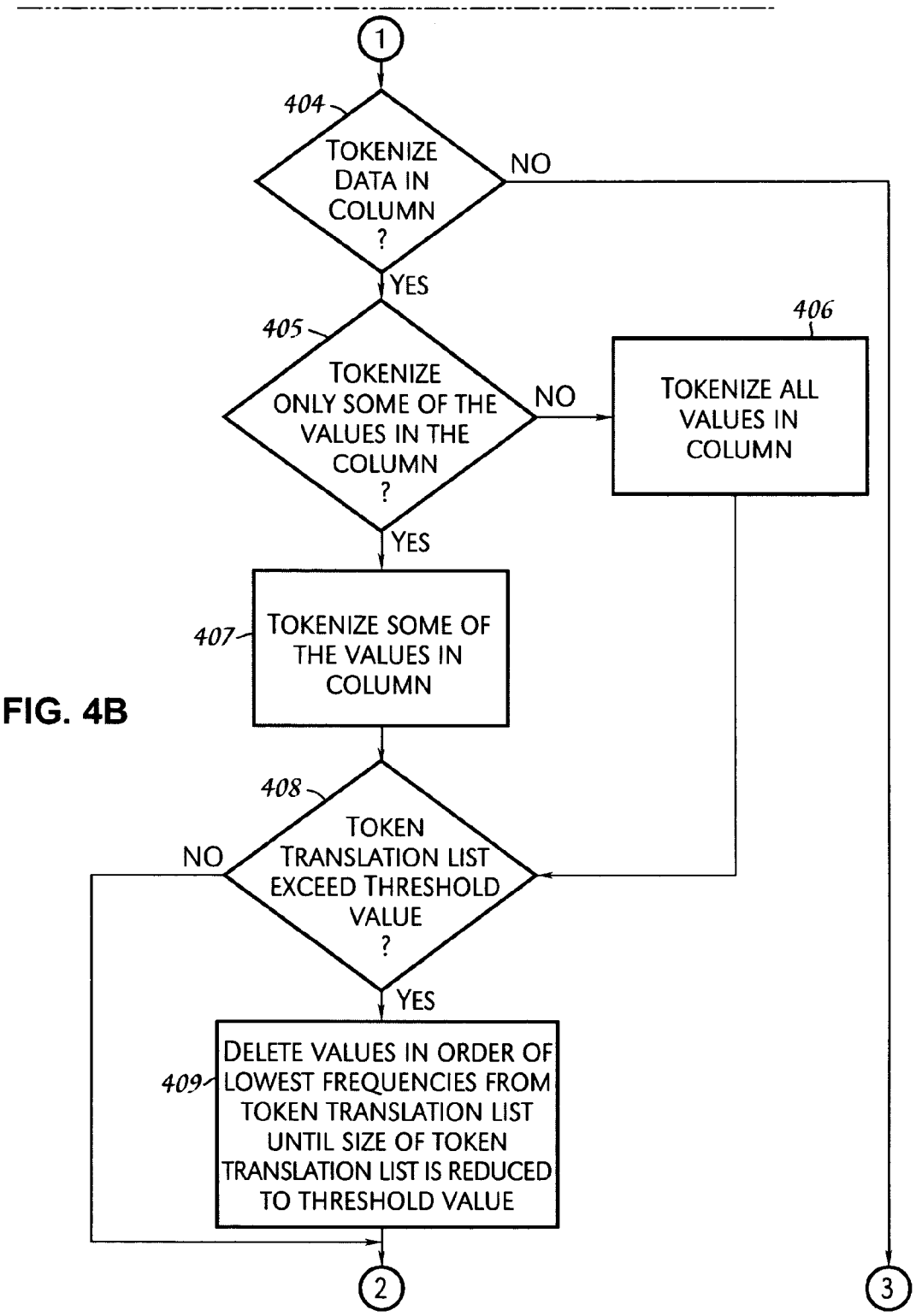

After application 150 stores the bit structure and assigned values in a parameter list in a control block (data structure) to be used in the decompression or if no few high frequency values within a column were identified, then, referring to FIG. 4B, in connection with FIGS. 1-3, in step 404, application 150 determines whether to tokenize data within a column read.

Application 150 may determine to tokenize data within a column if tokenization saves disk space. The determination as to whether to tokenize data within a column may be determined using the following statement (1) in connection with the value frequency list discussed above.

IF (collen*numrows)>numvalues*collen+
    numrows*toklen THEN tokenize column     (1)

where collen equals the length of column entries;

where numrows equals the number of rows read in the table (i.e., number of rows in the column of data read from database 200);

where numvalues equals the number of values in the value frequency list; and where toklen equals the minimum length of a token.

The left side of the arrow ">" in statement (1) indicates the total space required to store the column without compression. The right side of the arrow ">" in statement (1) is the storage required to store a tokenized version of the column. The right side of the arrow ">" in statement (1) includes the storage required to hold the token translation list (list of tokens is stored in a list referred to herein as the "token translation list") as well as includes the length required to store the token values in the table rows.

As a result of using statement (1) to determine whether a column will be tokenized, columns that have very high ratios of number of values to number of rows will not be tokenized since storing the token translation list defeats compression. In other words, statement (1) ensures that only columns will be tokenized if the overall storage space can be reduced by tokenizing.

If data in a column of database 200 is to be tokenized, then, in step 405, application 150 determines whether to tokenize only some of the values in the column. Application 150 may tokenize only some of the values in the column since some values with very low frequencies do not realize a storage advantage at the value level and since tokenizing all values may generate a token translation list that would require excessive disk accesses during decompression. Application 150 may use the following statement (2) to determine whether to tokenize only some of the values in the column.

IF STP<STT THEN tokenize a portion of the column
    read from database     (2)

where STP equals (collen*COUNT(SETa))+(toklen+1) *SUM(freq in SETa)+collen*SUM(freq in SETh);

where STT equals (toklen*numrows+collen*numvalues);

where collen is a length of column entries;

where numrows is a number of rows in a table (i.e., number of rows read from database 200);

where numvalues is a number of values in the value frequency list;

where toklen is a minimal length of a token;

where freq equals frequency for a specific value found in the data read from database 200;

where SETa equals all values that satisfy the following criteria:

(collen*freq)>(collen+(toklen+1)*freq);

where SETh equals all values that do not satisfy the following criteria:

(collen*freq)>(collen+(toklen+1)*freq); and where COUNT(SETa) equals the number of values in SETa.

In this manner, statement (2) may be used by application 150 to determine whether there is a benefit in not tokenizing all the values in the column.

If application 150 determines there is no value in tokenizing some of the values in the column, then, in step 406, application tokenizes all the values in the column. As mentioned above, tokenizing may refer to assigning a "token" or an integer value for a larger column value.

If, however, application 150 determines there is value in tokenizing some of the values in the column, then, in step 407, application 150 tokenizes some of the values in the column. In one embodiment, application 150 may tokenize some of the values by using a one character long token marker value in the first position to indicate that the value in the compressed file is a token. If that value is not present, then the value is considered already decompressed. This may have the effect of increasing the token length by one byte. In one embodiment, the token marker may be picked from a list of available characters assuring that the marker field is not the first character of any value in the column. In one embodiment, the marker is retained as a parameter in the control block to be used for decompressing the column.

Upon tokenizing all or some of the values in the column read in database 200, application 150, in step 408, determines whether the token translation list exceeds a threshold value. That is, application 150 determines whether the token translation list is too long to be held in memory 114 during processing. As mentioned above, a token translation list may refer to a list of token values that were used in tokenizing data in a column. In one embodiment, application 150 compares the size of the token translation list to a maximum token list size parameter. In one embodiment, the maximum token list size parameter is provided by the user or defaulted by system 100.

If the token translation list is greater than the maximum token list size parameter, then, in step 409, application 150 deletes values in order of lowest frequencies from the token translation list until the size of the token translation list is reduced to the maximum token list size parameter. In one embodiment, application 150 reduces the size of the token translation list by moving the lowest frequency values in SETa (as defined above) to SETb (as defined above) until the size of the token translation list is reduced to the maximum token list size parameter. Under this strategy, the token translation list includes tokens to only higher frequency values and the token translation list may be maintained in memory 114 all the time. As a result of having the token translation list include tokens to only higher frequency values and keeping the token translation list in memory 114 all the time, decompression may occur more quickly.

Figure 4C:
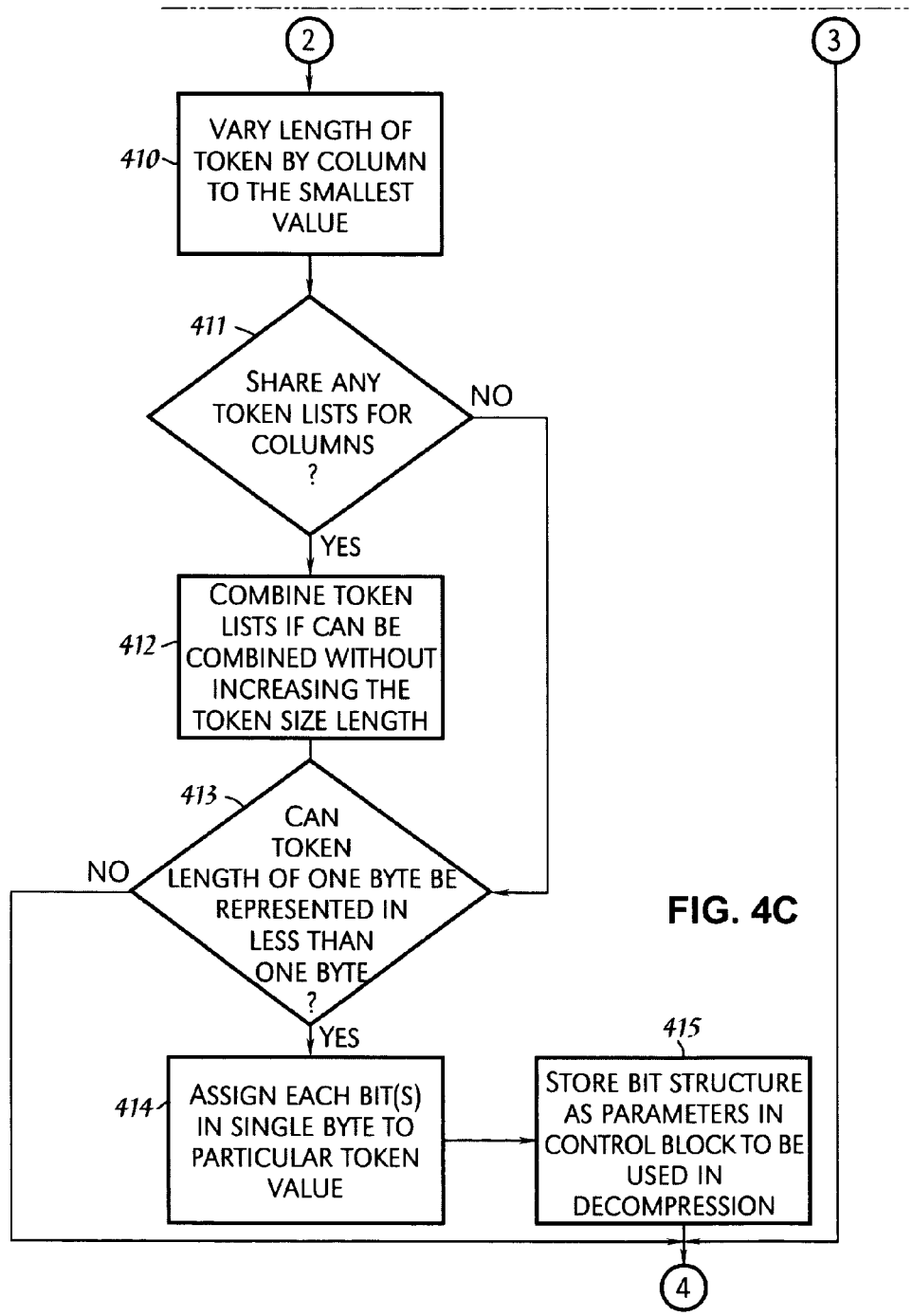

If there is no data to be tokenized in a column or after determining that the token translation list does not exceed the maximum token list size parameter or after reducing the length of the token translation list to be equal to the maximum token list size parameter, then, referring to FIG. 4C, in step 410, application 150 varies the length of the token by column to be the smallest value required.

In step 411, application 150 determines whether to share any of the token lists for the columns. A more detail description of step 411 is provided below in association with FIG. 5. FIG. 5 is a flowchart of the step of determining whether to share any of the token lists for the columns in accordance with an embodiment of the present invention.

Referring to FIG. 5, in conjunction with FIGS. 1-3 and 4A-C, in step 501, application 150 examines the token lists containing the same token length and the same value lengths in pairs beginning with the shortest lists and progressing to the largest list. In each pair comparison, if the lists can be combined without increasing the token size length then they are combined into a single list in step 502.

In step 503, application 150 determines whether there are any more token lists to compare. If there are more token lists to compare, then, in step 504, application 150 compares the combined list to the next smallest list.

If, however, there are no more lists to compare, then, in step 505, method 411 is terminated.

Returning to FIG. 4C, in conjunction with FIGS. 1-3 and 4A-B, as stated above, in step 411, application 150 determines whether to share any of the token lists for the columns. If there are token lists for the columns to be shared, then, in step 412, application 150 combines the token lists into a single list if they can be combined without increasing the token size length as discussed in association with FIG. 5.

Upon combining the token lists for the columns into a single list or upon determining that there are no token lists to be shared among the columns, then, in step 413, application 150 determines whether the token length of one byte can be represented in less than one byte. If the token length can be represented in less than one byte, then the column is treated the same as high frequency values, as discussed earlier. A bit structure containing a sufficient number of bits to hold the number of values in the list is assigned by application 150 in step 414. For example, if the list contained 55 values, then 6 bits would be assigned (a bit structure of 6 bits would be capable of storing 55 different values). Values are then assigned to bit combinations within the bit structure as binary numbers.

In step 415, application 150 stores the bit structure and value list (values assigned to bit combinations) as parameters in the control block to be used in the decompression.

Figure 4D:
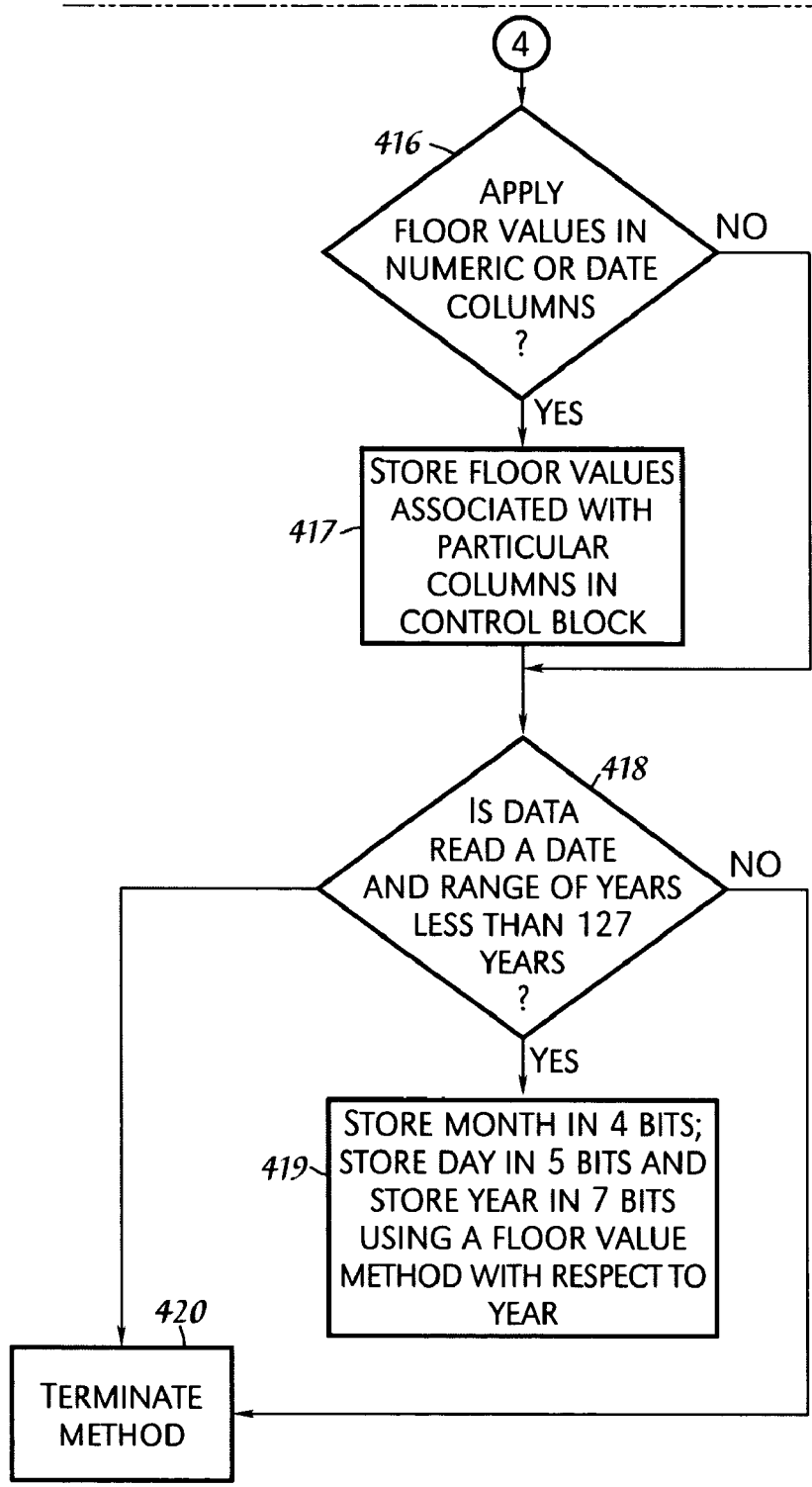

Upon storing the bit structure and value list as parameters in the control block to be used in the decompression or if there are no token lengths of one byte that can be represented in less than one byte, then, referring to FIG. 4D, in conjunction with FIGS. 1-3 and FIGS. 4A-C, in step 416, application 150 determines whether to apply "floor values" in numeric or date columns read. As stated above, application 150 computes a range of values in numeric and the year component of date columns in step 303. A "floor value" may be determined from the range of values and used to save storage space as discussed below.

A more detail description of step 416 is provided below in association with FIGS. 6A-B. FIGS. 6A-B are a flowchart of the step of determining whether to apply floor values in the numeric or date columns read in step 301 in accordance with an embodiment of the present invention.

Referring to FIG. 6A, in conjunction with FIGS. 1-3 and 4A-D, in step 601, application 150 sets the compressed length to the byte size needed to hold the numeric value representing the difference between the high and low values. As mentioned above, application 150 computes a range of values in numeric and date columns in step 303. Application 150 may set the compressed length to the byte size needed to hold the value that equals the difference between the high and low values in the range of values computed by application 150 in step 303.

In step 602, application 150 computes the compressed column size if tokens were used.

In step 603, application 150 computes the column size for keeping the numbers in their original form but using the smallest number of bytes.

In step 604, application 150 computes the column size needed for floor based compression. In one embodiment, application 150 computes the column size needed for floor based compression by setting the floor value to equal the low value in the range computed by application 150 in step 303. Application 150 then computes the column size based on storing the column values as the difference between the real values and the floor value. For example, suppose application 150 computed a range of values from 100,000 to 150,000 in step 303. The floor value may be set to equal the value of 100,000. Since the difference between the real values and the floor value are stored in the disk storage space, the values of 0 to 50,000 would be stored in the storage space as opposed to the values of 100,000 to 150,000. This results in a saving of one byte. Storing the difference between the real values and the floor value are stored in the disk storage space may be referred to as "floor based compression" herein. In another embodiment, application 150 may compute the column size needed for floor based compression based on a floor value that is set equal to one half the difference between the maximum integer value size and the range as discussed further below in connection with step 609.

In step 605, application 150 selects the smallest column size computed among steps 601-604.

In step 606, application 150 determines if two of the compressed column sizes computed among steps 601-604 are the same. If so, then, referring to FIG. 6B, in step 607, application selects the algorithm based on the following precedence order: no compression; reduced size but no changes in values; floor based compression; and tokenized. For example, if the column size computed in step 604 is equal to the column size computed in step 603, then the column size computed in step 603 is selected. If the column size computed in step 604 is equal to the column size computed in step 602, then the column size computed in step 604 is selected. In another example, if the column size computed in step 602 is equal to the column size computed in step 603, then the column size computed in step 603 is selected and so forth.

Upon selecting the algorithm in step 607 or if there are no two equal computations among steps 601-604, then, in step 608, application 150 determines if floor based compression was selected or if the smallest column size selected was for floor based compression.

If floor based compression was selected or if the smallest column size selected was for floor based compression, then, in step 609, application 150 sets the floor value to equal one half the difference between the maximum integer value in the column and the range of values in the column. For example, suppose that application 150 computed a range of 100,000 to 150,000. The floor value may be set equal to one half the difference between the maximum integer value size (150,000) and the range (50,000) which would result in the value of 50,000. The floor value may then be stored as a parameter in the control block to be used in the decompression. By setting the floor value to equal one half the difference between the maximum integer value size and the range computed by application 150 instead of setting the floor value to equal the low value in the range computed by application 150 (as discussed in connection with step 604), there is less likely a chance that a lower value than the floor value would be found in a subsequent reading of the source data from database 200. Hence, in one embodiment, the parameters (floor value stored as a parameter in the control block in a later step) acquired in the first pass (step 301) of a previous reading may be used in a subsequent reading of the source data without having to repeat the first pass (step 301) in determining the algorithms and parameters in reading the source data. As a result, load time may be saved.

In step 610, application 150 stores the column values as the difference between the real values and the floor value. Method 416 is then terminated in step 611.

Alternatively, if floor based compression was not selected, then method 416 is terminated in step 611.

Returning to FIG. 4D, as stated above, in step 416, a determination is made as to whether to apply floor value compression to a numeric or date column. If application 150 determines to apply floor value compression to a numeric or date column, then, in step 417, application 150 stores the floor values to be used in floor value compression in the control block for the appropriate columns.

Upon storing the floor values to be used in floor value compression for the appropriate columns or if floor value compression is not to be used for any numeric or date columns, then, in step 418, application 150 determines for each source data read in step 301 whether the data read is a date (month, day and year).

If the data read in step 301 is a date, and the range of years is less than 127 years, then, in step 419, application 150 stores the month in four bits; stores the day in five bits and stores the year in seven bits using the floor value compression method described above in conjunction with FIGS. 6A-B with respect to the year. These separate bit strings (four bit string to store the month; five bit string to store the day and the seven bit string to store the year) are strung together into a two byte value. The floor value for the year may be stored as a parameter in the control block to later be used in the decompression. Hence, in this embodiment, the entire date may be stored in two bytes and may be decompressed in a reasonably fashioned manner since decompression requires less machine cycles to restore the date than is required of data compression algorithms that use days since logic.

Upon storing the date using the algorithm outlined above, method 304 is terminated in step 420.

If, however, the source data read was not a date, then method 304 is terminated in step 420.

Returning to FIG. 3, in conjunction with FIGS. 1-2, 4A-D, 5 and 6A-B, as stated above, in step 304, application 150 selects, for each column read, the one or more algorithms to compress the source data read from that particular column.

In step 305, application 150 generates the parameters (e.g., floor value), as discussed above in connection with FIGS. 4A-D, 5 and 6A-B, used to decompress the compressed source data.

In step 306, application 150 stores the algorithms selected in step 304 and stores the parameters generated in step 304 in a control block, which may refer to a data structure created by application 150 that is stored in disk unit 120. It is noted the control block includes information that may be used to link the columns with the algorithm(s) selected to compress the data in those columns. Further, it is noted that the control block may include information that may be used to link the particular values in a column that have been compressed with the parameters that are used to decompress those compressed values.

In step 307, application 150 reads the source data from database 200 row by row and column by column within each row a second time. The second reading of the source data may be referred to herein as the "second pass."

In step 308, application 150 compresses the source data read during the second pass by applying the algorithms or strategies (discussed above in connection with FIGS. 4A-D, 5 and 6A-B) stored in the control block to the appropriate columns read.

In step 309, application 150 decompresses the compressed source data using the appropriate column algorithm and parameters stored in the control block. That is, in step 309, application 150 decompresses the compressed source data by applying the parameters to the appropriate compressed data values.

By selectively applying the various algorithms or parameters (discussed above in connection with FIGS. 4A-D, 5 and 6A-B) in compressing the source data read column by column and then decompressing that compressed source data by applying the parameters (discussed above in connection with FIGS. 4A-D, 5 and 6A-B) to the appropriate compressed data values, a better balance may be achieved between compression efficiency and access performance.

It is noted that method 300 (including the methods depicting the sub-steps of method 300) may include other and/or additional steps that, for clarity, are not depicted. It is further noted that method 300 (including the methods depicting the sub-steps of method 300) may be executed in a different order presented and that the order presented in the discussion of FIGS. 3, 4A-D, 5 and 6A-B is illustrative. It is further noted that certain steps in method 300 (including the methods depicting the sub-steps of method 300) may be executed in a substantially simultaneous manner.

Although the method, computer program product and system are described in connection with several embodiments, it is not intended to be limited to the specific forms set forth herein, but on the contrary, it is intended to cover such alternatives, modifications and equivalents, as can be reasonably included within the spirit and scope of the invention as defined by the appended claims. It is noted that the headings are used only for organizational purposes and not meant to limit the scope of the description or claims.

The invention claimed is:

1. A method for balancing compression efficiency against access performance comprising the steps of:
    reading source data from a database row by row;
    generating a value frequency list indicating all unique values found for each column in each row read in said database and a frequency of occurrence for each value;
    selecting one or more algorithms to compress said source data read for each column, wherein said one or more algorithms are selected based on said value frequency list and said frequency of occurrence for each value;
    storing said selected one or more algorithms to compress said source data read for each column in a control block;
    reading said source data a second time row by row;
    compressing said source data read said second time using said stored selected one or more algorithms; and
    determining whether to tokenize a portion of a column read from said database using the following statement:

IF STP<STT THEN tokenize said portion of said column read from said database;

wherein said STP=(collen*COUNT(SETa))+(toklen+1)*SUM(freq in SETa)+collen*SUM(freq in SETb);
    wherein said STT=(toklen*numrows+collen*numvalues);
    wherein said collen is a length of column entries;
    wherein said numrows is a number of rows read in a table of said database;
    wherein said numvalues is a number of values in said value frequency list;
    wherein said toklen is a minimal length of a token;
    wherein said freq=frequency for a specific value found in said data read from said database;
    wherein SETa=all values that satisfy the following criteria:

(collen*freq)>(collen+(toklen+1)*freq);

wherein SETb=all values that do not satisfy the following criteria:

(collen*freq)>(collen+(toklen+1)*freq); and wherein COUNT(SETa)=number of values in SETa.

2. The method as recited in claim 1 further comprising the step of:
    computing a range of values in numeric and date columns read in said database, wherein said one or more algorithms are selected based on said range of values in numeric and date columns read in said database.

3. The method as recited in claim 2 further comprising the step of:
    setting a floor value to equal one-half the difference between a maximum integer value and said range of values.

4. The method as recited in claim 3 further comprising the step of:
    storing column values as a difference between real values and said floor value.

5. The method as recited in claim 2 further comprising the steps of:
    computing a first column size for keeping numbers in their original form but using a smallest number of bytes;
    computing a second column size needed for floor based compression; and
    computing a third column size if tokens were used, wherein said third column size is a compressed column size.

6. The method as recited in claim 5 further comprising the step of:
    selecting a smallest of said first, said second and said third computed column size.

7. The method as recited in claim 5, wherein if said first column size is equal to said second column size, then the method further comprises the step of:
    selecting said first computed column size.

8. The method as recited in claim 5, wherein if said first column size is equal to said third column size, then the method further comprises the step of:
    selecting said first computed column size.

9. The method as recited in claim 5, wherein if said second column size is equal to said third column size, then the method further comprises the step of:
    selecting said second computed column size.

10. The method as recited in claim 1 further comprising the steps of:
    generating one or more parameters used to decompress said compressed source data; and
    storing said generated one or more parameters in said control block.

11. The method as recited in claim 10 further comprising the step of:
    decompressing said compressed source data using said one or more parameters.

12. The method as recited in claim 1 further comprising the step of:
    assigning a bit structure to high frequency values as determined in said value frequency list as well as including a bit value indicating not tokenized.

13. The method as recited in claim 12 further comprising the step of:
    storing said bit structure assigned to each high frequency value, said value frequency list and said bit structure value indicating not tokenized in said control block.

14. The method as recited in claim 13 further comprising the step of:
    decompressing said compressed source data using said stored bit structure assigned to each high frequency value.

15. The method as recited in claim 1 further comprising the steps of:
    determining whether to tokenize a column read from said database using the following statement:

IF (collen*numrows)>numvalues*collen+numrows*toklen THEN tokenize column;

wherein said collen is a length of column entries;
    wherein said numrows is a number of rows in a table read from said database;
    wherein said numvalues is a number of values in said value frequency list; and
    wherein said toklen is a minimal length of a token.

16. The method as recited in claim 15 further comprising the step of:
    tokenizing all values in a column read from said database.

17. The method as recited in claim 15 further comprising the step of:
    tokenizing a portion of values in a column read from said database.

18. The method as recited in claim 1 further comprising the step of:
    tokenizing at least a portion of values in a column read from said database, wherein said tokenized values are stored in a token translation list.

19. The method as recited in claim 18 further comprising the step of:
    determining whether said token translation list exceeds a threshold value.

20. The method as recited in claim 19, wherein if said token translation list exceeds said threshold value, then the method further comprises the step of:
    deleting values from said token translation list in order of lowest frequencies until said token translation list is reduced to said threshold value.

21. The method as recited in claim 18 further comprising the step of:
    varying a length of a token by column to a smallest value required.

22. The method as recited in claim 18 further comprising the step of:
    assigning a bit structure value in a bit structure of less than one byte to a particular token value.

23. The method as recited in claim 22 further comprising the steps of:
    storing said bit structure and said particular token value in said control block;
    decompressing said compressed source data using said stored bit structure.

24. The method as recited in claim 1 further comprising the step of:
    tokenizing at least a portion of values in columns read from said database, wherein said tokenized values are stored in token translation lists, wherein each of said token translation lists are associated with a column read from said database.

25. The method as recited in claim 24 further comprising the step of:
    combining two or more token translation lists if said two or more token translation lists can be combined without increasing a token size length.

26. The method as recited in claim 1, wherein if a date is read from said database and a range of years is less than 127, then the method further comprises the steps of:
    storing a value for month in four bits;
    storing a value for day in five bits; and
    storing a value for year in seven bits;
    wherein said values for said month, day and year are strung together into a two byte value.

27. A computer program product embodied in a computer readable medium for balancing compression efficiency against access performance comprising the programming steps of:
    reading source data from a database row by row;
    generating a value frequency list indicating all unique values found for each column in each row read in said database and a frequency of occurrence for each value;
    selecting one or more algorithms to compress said source data read for each column, wherein said one or more algorithms are selected based on said value frequency list and said frequency of occurrence for each value;
    storing said selected one or more algorithms to compress said source data read for each column in a control block;
    reading said source data a second time row by row;
    compressing said source data read said second time using said stored selected one or more algorithms; and
    determining whether to tokenize a portion of a column read from said database using the following statement:

IF STP<STT THEN tokenize said portion of said column read from said database;

wherein said STP=(collen*COUNT(SETa))+(toklen+1)*SUM(freq in SETa)+collen*SUM(freq in SETb);
    wherein said STT=(toklen*numrows+collen*numvalues);
    wherein said collen is a length of column entries;
    wherein said numrows is a number of rows read in a table of said database;
    wherein said numvalues is a number of values in said value frequency list;
    wherein said toklen is a minimal length of a token;
    wherein said freq=frequency for a specific value found in said data read from said database;
    wherein SETa=all values that satisfy the following criteria:

(collen*freq)>(collen+(toklen+1)*freq);

wherein SETb=all values that do not satisfy the following criteria:

(collen*freq)>(collen+(toklen+1)*freq); and wherein COUNT(SETa)=number of values in SETa.

28. The computer program product as recited in claim 27 further comprising the programming step of:
    computing a range of values in numeric and date columns read in said database, wherein said one or more algorithms are selected based on said range of values in numeric and date columns read in said database.

29. The computer program product as recited in claim 28 further comprising the programming step of:
    setting a floor value to equal one-half the difference between a maximum integer value and said range of values.

30. The computer program product as recited in claim 29 further comprising the programming step of:
    storing column values as a difference between real values and said floor value.

31. The computer program product as recited in claim 28 further comprising the programming steps of:
    computing a first column size for keeping numbers in their original form but using a smallest number of bytes;
    computing a second column size needed for floor based compression; and
    computing a third column size if tokens were used, wherein said third column size is a compressed column size.

32. The computer program product as recited in claim 31 further comprising the programming step of:
    selecting a smallest of said first, said second and said third computed column size.

33. The computer program product as recited in claim 31, wherein if said first column size is equal to said second column size, then the computer program product further comprises the programming step of:
    selecting said first computed column size.

34. The computer program product as recited in claim 31, wherein if said first column size is equal to said third column size, then the computer program product further comprises the programming step of:
    selecting said first computed column size.

35. The computer program product as recited in claim 31, wherein if said second column size is equal to said third column size, then the computer program product further comprises the programming step of:

selecting said second computed column size.

36. The computer program product as recited in claim 27 further comprising the programming steps of:

generating one or more parameters used to decompress said compressed source data; and storing said generated one or more parameters in said control block.

37. The computer program product as recited in claim 36 further comprising the programming step of:

decompressing said compressed source data using said one or more parameters.

38. The computer program product as recited in claim 27 further comprising the programming step of:

assigning a bit structure to high frequency values as determined in said value frequency list as well as including a bit value indicating not tokenized.

39. The computer program product as recited in claim 38 further comprising the programming step of:

storing said bit structure assigned to each high frequency value, said value frequency list and said bit structure value indicating not tokenized in said control block.

40. The computer program product as recited in claim 39 further comprising the programming step of:

decompressing said compressed source data using said stored bit structure assigned to each high frequency value.

41. The computer program product as recited in claim 27 further comprising the programming steps of:

determining whether to tokenize a column read from said database using the following statement:

IF (collen*numrows)>numvalues*collen+
numrows*toklen THEN tokenize column;

wherein said collen is a length of column entries;

wherein said numrows is a number of rows read in a table of said database;

wherein said numvalues is a number of values in said value frequency list; and wherein said toklen is a minimal length of a token.

42. The computer program product as recited in claim 41 further comprising the programming step of:

tokenizing all values in a column read from said database.

43. The computer program product as recited in claim 41 further comprising the programming step of:

tokenizing a portion of values in a column read from said database.

44. The computer program product as recited in claim 27 further comprising the programming step of:

tokenizing at least a portion of values in a column read from said database, wherein said tokenized values are stored in a token translation list.

45. The computer program product as recited in claim 44 further comprising the programming step of:

determining whether said token translation list exceeds a threshold value.

46. The computer program product as recited in claim 45, wherein if said token translation list exceeds said threshold value, then the computer program product further comprises the programming step of:

deleting values from said token translation list in order of lowest frequencies until said token translation list is reduced to said threshold value.

47. The computer program product as recited in claim 44 further comprising the programming step of:

varying a length of a token by column to a smallest value required.

48. The computer program product as recited in claim 44 further comprising the programming step of:

assigning a bit structure value in a bit structure of less than one byte to a particular token value.

49. The computer program product as recited in claim 48 further comprising the programming steps of:

storing said bit structure and said particular token value in said control block;

decompressing said compressed source data using said stored bit structure.

50. The computer program product as recited in claim 27 further comprising the programming step of:

tokenizing at least a portion of values in columns read from said database, wherein said tokenized values are stored in token translation lists, wherein each of said token translation lists are associated with a column read from said database.

51. The computer program product as recited in claim 50 further comprising the programming step of:

combining two or more token translation lists if said two or more token translation lists can be combined without increasing a token size length.

52. The computer program product as recited in claim 27, wherein if a date is read from said database and a range of years is less than 127, then the computer program product further comprises the programming steps of:

storing a value for month in four bits;

storing a value for day in five bits; and storing a value for year in seven bits;

wherein said values for said month, day and year are strung together into a two byte value.

53. A system, comprising:

a memory unit for storing a computer program operable for balancing compression efficiency against access performance; and a processor coupled to said memory unit, wherein said processor, responsive to said computer program, comprises circuitry for reading source data from a database row by row;

circuitry for generating a value frequency list indicating all unique values found for each column in each row read in said database and a frequency of occurrence for each value;

circuitry for selecting one or more algorithms to compress said source data read for each column, wherein said one or more algorithms are selected based on said value frequency list and said frequency of occurrence for each value;

circuitry for storing said selected one or more algorithms to compress said source data read for each column in a control block;

circuitry for reading said source data a second time row by row;

circuitry for compressing said source data read said second time using said stored selected one or more algorithms; and circuitry for determining whether to tokenize a portion of a column read from said database using the following statement:

IF STP<STT THEN tokenize said portion of said column read from said database;

wherein said STP=(collen*COUNT(SETa))+(toklen+
   1)*SUM(freq in SETa)+collen*SUM(freq in SETb);
wherein said STT=(toklen*numrows+collen*numvalues),
wherein said collen is a length of column entries;
wherein said numrows is a number of rows read in a table of said database;
wherein said numvalues is a number of values in said value frequency list;
wherein said toklen is a minimal length of a token;
wherein said freq=frequency for a specific value found in said data read from said database;
wherein SETa=all values that satisfy the following criteria:

(collen*freq)>(collen+(toklen+1)*freq);

wherein SETb=all values that do not satisfy the following criteria:

(collen*freq)>(collen+(toklen+1)*freq); and wherein COUNT(SETa)=number of values in SETa.

54. The system as recited in claim 53, wherein said processor further comprises:
   circuitry for computing a range of values in numeric and date columns read in said database, wherein said one or more algorithms are selected based on said range of values in numeric and date columns read in said database.

55. The system as recited in claim 54, wherein said processor further comprises:
   circuitry for setting a floor value to equal one-half the difference between a maximum integer value and said range of values.

56. The system as recited in claim 55, wherein said processor further comprises:
   circuitry for storing column values as a difference between real values and said floor value.

57. The system as recited in claim 54, wherein said processor further comprises:
   circuitry for computing a first column size for keeping numbers in their original form but using a smallest number of bytes;
   circuitry for computing a second column size needed for floor based compression; and
   circuitry for computing a third column size if tokens were used, wherein said third column size is a compressed column size.

58. The system as recited in claim 57, wherein said processor further comprises:
   circuitry for selecting a smallest of said first, said second and said third computed column size.

59. The system as recited in claim 57, wherein if said first column size is equal to said second column size, then said processor further comprises:
   circuitry for selecting said first computed column size.

60. The system as recited in claim 57, wherein if said first column size is equal to said third column size, then said processor further comprises:
   circuitry for selecting said first computed column size.

61. The system as recited in claim 57, wherein if said second column size is equal to said third column size, then said processor further comprises:
   circuitry for selecting said second computed column size.

62. The system as recited in claim 53, wherein said processor further comprises:
   circuitry for generating one or more parameters used to decompress said compressed source data; and
   circuitry for storing said generated one or more parameters in said control block.

63. The system as recited in claim 62, wherein said processor further comprises:
   circuitry for decompressing said compressed source data using said one or more parameters.

64. The system as recited in claim 53, wherein said processor further comprises:
   circuitry for assigning a bit structure to high frequency values as determined in said value frequency list as well as including a bit value indicating not tokenized.

65. The system as recited in claim 64, wherein said processor further comprises:
   circuitry for storing said bit structure assigned to each high frequency value, said value frequency list and said bit structure value indicating not tokenized in said control block.

66. The system as recited in claim 65, wherein said processor further comprises:
   circuitry for decompressing said compressed source data using said stored bit structure assigned to each high frequency value.

67. The system as recited in claim 53, wherein said processor further comprises:
   circuitry for determining whether to tokenize a column read from said database using the following statement:

IF (collen*numrows)>numvalues*collen+
      numrows*toklen THEN tokenize column;

wherein said collen is a length of column entries;
   wherein said numrows is a number of rows read in a table of said database;
   wherein said numvalues is a number of values in said value frequency list; and
   wherein said toklen is a minimal length of a token.

68. The system as recited in claim 67, wherein said processor further comprises:
   circuitry for tokenizing all values in a column read from said database.

69. The system as recited in claim 67, wherein said processor further comprises:
   circuitry for tokenizing a portion of values in a column read from said database.

70. The system as recited in claim 53, wherein said processor further comprises:
   circuitry for tokenizing at least a portion of values in a column read from said database, wherein said tokenized values are stored in a token translation list.

71. The system as recited in claim 70, wherein said processor further comprises:
   circuitry for determining whether said token translation list exceeds a threshold value.

72. The system as recited in claim 71, wherein if said token translation list exceeds said threshold value, then the processor further comprises:
   circuitry for deleting values from said token translation list in order of lowest frequencies until said token translation list is reduced to said threshold value.

73. The system as recited in claim 70, wherein said processor further comprises:
   circuitry for varying a length of a token by column to a smallest value required.

74. The system as recited in claim 70, wherein said processor further comprises:
   circuitry for assigning a bit structure value in a bit structure of less than one byte to a particular token value.

75. The system as recited in claim 74, wherein said processor further comprises:

circuitry for storing said bit structure and said particular token value in said control block;

circuitry for decompressing said compressed source data using said stored bit structure.

76. The system as recited in claim 53, wherein said processor further comprises:

circuitry for tokenizing at least a portion of values in columns read from said database, wherein said tokenized values are stored in token translation lists, wherein each of said token translation lists are associated with a column read from said database.

77. The system as recited in claim 76, wherein said processor further comprises:

circuitry for combining two or more token translation lists if said two or more token translation lists can be combined without increasing a token size length.

78. The system as recited in claim 53, wherein if a date is read from said database and a range of years is less than 127, then said processor further comprises:

circuitry for storing a value for month in four bits;

circuitry for storing a value for day in five bits; and circuitry for storing a value for year in seven bits;

wherein said values for said month, day and year are strung together into a two byte value.

\* \* \* \* \*